| United States Patent [19] | [11] Patent Number: 5,019,367 |
| Oguri et al. | [45] Date of Patent: May 28, 1991 |

[54] METHOD FOR PRODUCING BOEHMITE

[75] Inventors: Yasuo Oguri, Tokyo; Takao Koga; Toshio Itoh, both of Niigata, all of Japan

[73] Assignees: Mitsubishi Kasei Corporation; Kasei Naoetsu Industries Limited, both of Tokyo, Japan

[21] Appl. No.: 491,153

[22] Filed: Mar. 9, 1990

[30] Foreign Application Priority Data

Mar. 14, 1989 [JP] Japan .................................. 1-61452

[51] Int. Cl.$^5$ .............................................. C01F 7/02
[52] U.S. Cl. .................................. 423/626; 423/625; 501/153
[58] Field of Search ............... 423/625, 626, 627, 628; 501/153

[56] References Cited

U.S. PATENT DOCUMENTS 4,344,928  8/1982  Dupin et al. ..................... 423/625

FOREIGN PATENT DOCUMENTS 59-78926   5/1984  Japan .
61-67258  10/1987  Japan .

*Primary Examiner*—H. M. S. Sneed
*Assistant Examiner*—R. Bruce Breneman
*Attorney, Agent, or Firm*—Oblon, Spivak, McClelland, Maier & Neustadt

[57] ABSTRACT

A method for producing boehmite, which comprises subjecting aluminum hydroxide dispersed in water to treatment under heat and pressure in the presence of maleic acid and/or maleic acid.

7 Claims, No Drawings

METHOD FOR PRODUCING BOEHMITE

The present invention relates to a method for producing boehmite having a small particle size and a uniform particle size distribution. More particularly, it relates to a method for producing boehmite suitable as a starting material for the production of easily sinterable alumina.

In resent years, high alumina materials are used in large amounts as starting materials for ceramics for electronic parts or for sparkplug glass for internal combustion engines or as starting materials for carriers for catalysts. Alumina as the starting material for such high alumina materials, is required to be fine particles having a particle size of at most 1 $\mu$m and to have a particle size as uniform as possible so that it can be sintered to a high density (hereinafter referred to as "easily sinterable") after molding. Further, it is required to reduce the content of $Na_2O$ as small as possible, since $Na_2O$ contained in alumina lowers the electrical insulating properties or the heat resistance, or it lowers the strength as a carrier for a catalyst.

Alumina which is available on an industrial scale in large amounts at low costs, is produced by calcining aluminum hydroxide produced by a Bayer method. Alumina produced by such a method usually contains from 0.2 to 0.4% by weight of $Na_2O$ and can not be used by itself for the above mentioned purpose.

As a method for reducing the content of $Na_2O$, a method has been proposed wherein an aqueous slurry of aluminum hydroxide is treated in an autoclave at a temperature of at least 177° C. to convert it to boehmite, followed by dehydration and washing with water (U.S. Pat. Nos. 2,774,744 and 3,628,914). According to this method, when aluminum hydroxide is converted to boehmite, sodium present in the crystals of aluminum hydroxide or in the crystal grain boundaries, is discharged. Therefore, it is possible to easily reduce the content of $Na_2O$ by washing with water. However, boehmite tends to grow to large particles having good crystallinity, and alumina prepared by calcining the resulting boehmite also has a large particle size at a level of from 5 to 50 $\mu$m, whereby it is not possible to obtain the desired easily sinterable alumina. Even when the alumina is sintered after molding, it is hardly possible to attain high densification, whereby it is impossible to obtain a molding material such as an insulating material having high strength and high abrasion resistance.

The present inventors have previously proposed a method for producing a readily sinterable alumina, which comprises adding a water-soluble carboxylic acid having at least two carboxyl groups at the time of preparing boehmite by subjecting aluminum hydroxide dispersed in water to treatment under heat and pressure, to obtain boehmite having a small particle size and uniform particle size distribution and a low sodium content, followed by calcining the boehmite (Japanese Unexamined Patent Publication No. 78926/1984).

The present inventors have conducted further studies on the basis of the previous findings on boehmite and as a result, have found that the particle size of boehmite varies depending upon the type of the carboxylic acid used, and certain carboxylic acids not mentioned in the above publication present boehmite having a smaller particle size. The present invention has been accomplished on the basis of this discovery.

The present invention provides a method for producing boehmite, which comprises subjecting aluminum hydroxide dispersed in water to treatment under heat and pressure in the presence of maleic acid and /or malic acid.

Now, the present invention will be described in detail with reference to the preferred embodiments.

The aluminum hydroxide to be used in the present invention is not particularly limited. For example, aluminum hydroxide obtained by a Bayer method, can be used. If the particle size is too large, treatment at a high temperature for a long period of time will be required for the conversion to boehmite. On the other hand, if it is too small, handling tends to be difficult. Therefore, it is usually preferred to employ aluminum hydroxide having a particle size of at least 0.1 $\mu$m, preferably from 0.5 to 50 $\mu$m.

The carboxylic acids to be used in the present invention are maleic acid and/or malic acid. The malic acid may be D-form or L-form. It is usual, however, to employ DL-form which is a mixture of equal amounts of D-and L-forms. These acids are used in and amount of from 0.5 to 30% by weight, preferably from 2 to 20% by weight, relative to the aluminum hydroxide.

The above mentioned aluminum hydroxide and maleic acid or malic acid are dispersed in water and subjected to hydrothermal treatment under heat and pressure to obtain boehmite.

The amount of water is from 1 to 50 times by weight, preferably from 2 to 30 times by weight, relative to the solid content.

The conditions for the hydrothermal reaction vary depending upon the particle size of aluminum hydroxide used. However, the hydrothermal reaction is usually conducted at a temperature of from 150° to 280° C. under a pressure of from 5 to 65 kg/cm$^2$G for from 0.1 to 20 hours, preferably at a temperature of from 170° to 250° C. under a pressure of from 8 to 40 kg/cm$^2$G for from 0.5 to 10 hours.

The boehmite suspension thus obtained is washed with water and dried in a usual manner, whereby boehmite having a low sodium content at a level of not higher than 0.05% by weight and having a crystal size of not larger than 110 Å, can be recovered.

The reasons why such effects can be obtained by the addition of carboxylic acids of the present invention, are not clearly understood. As one of the reasons, it is believed that by a decrease of the pH, the solubility of aluminum hydroxide is increased, and the nuclear-forming speed is increased, and the acids play a role of so-called crystal catalyzer at certain crystal faces of the aluminum hydroxide or boehmite, to form fine particles.

The boehmite obtained by the present invention using the specific acids is extremely fine particles having a crystal size (as measured from a half-value width of the X-ray diffraction of the boehmite (020)) of at most 110 Å and a specific surface area of at least 200 m$^2$/g, and the sodium content is less than 500 ppm.

This boehmite may be used, for example, as a carrier for catalysts and as a starting material for easily sinterable alumina.

Now, the present invention will be described in further detail with reference to Examples. However, it should be understood that the present invention is by no means restricted by such specific Examples.

In the Examples, "parts" means "parts by weight" unless otherwise specified.

EXAMPLE 1

1,000 parts of water was added to 100 parts of aluminum hydroxide ($Al(OH)_3$, average particle size: 3.3 μm, $Na_2O$ content: 0.39% by weight) and 6 parts of maleic acid to obtain a suspension.

This suspension was reacted in an autoclave at 220° C. under 24 kg/cm²G to obtain a boehmite suspension, followed by washing with water, fitration and drying at 100° C. for one hour. The boehmite thus obtained had a $Na_2O$ content of not higher than 0.01% by weight and was a powder having a crystal size of 107 Å and a specific surface area of 245 m²/g.

The boehmite powder was calcined at 1,300° C. for one hour to convert it to $\alpha$-$Al_2O_3$. Then, this powder was compression molded under 1 ton/cm² to a bulk density of 1.57 g/cm³, followed by calcining at 1,550° C. for two hours, to obtain a shaped product having a bulk density of 3.84 g/cm³. Namely, a highly dense shaped product having the sintering reached to 96.2% of the theoretical density 3.99 g/cm³ of $Al_2O^3$, was obtained.

EXAMPLE 2 AND COMPARATIVE EXAMPLES 1 TO 6

Boehmite was prepared in the same manner as in Example 1 except that instead of maleic acid, various water-soluble dicarboxylic acids were employed. The crystal size of the boehmite thus obtained was measured. The results are shown in Table 1 together with the results of Example 1.

TABLE 1

|  | Type of carboxylic acid | Crystal size of boehmite (Å) |
| --- | --- | --- |
| Example 1 | Maleic acid | 107 |
| Example 2 | DL-malic acid | 103 |
| Comparative Example 1 | Citric acid | 150 |
| Comparative Example 2 | Glutamic acid | 231 |
| Comparative Example 3 | Phthalic acid | 244 |
| Comparative Example 4 | Salicylic acid | 184 |
| Comparative Example 5 | Fumaric acid | 179 |

According to the present invention, it is possible to obtain extremely fine boehmite having a minimum Na content, which is excellent as a carrier for catalysts or as a starting material for easily sinterable alumina.

What is claimed is:

1. A method for producing boehmite, which comprises subjecting aluminum hydroxide dispersed in water to treatment under heat and pressure in the presence of maleic acid and/or malic acid.

2. The method according to claim 1, wherein the aluminum hydroxide has a particle size of at least 0.1 μm.

3. The method according to claim 2, wherein the aluminum hydroxide has a particle size of from 0.5 to 50 μm.

4. The method according to claim 1, wherein the maleic acid and/or malic acid is used in an amount of from 0.5 to 30% by weight relative to the aluminum hydroxide.

5. The method according to claim 4, wherein the maleic acid and/or malic acid is used in an amount of from 2 to 20% by weight relative to the aluminum hydroxide.

6. The method according to claim 1, wherein the treatment under heat and pressure is conducted within a range of from 150° to 280° C. under a pressure of from 5 to 65 kg/cm²G.

7. The method according to claim 1, wherein the boehmite obtained is a boehmite having a sodium content of at most 0.05% by weight and a crystal size of at most 110 Å.

* * * * *